US011475303B2

(12) United States Patent
Wagner et al.

(10) Patent No.: US 11,475,303 B2
(45) Date of Patent: Oct. 18, 2022

(54) SPREAD NEURAL NETWORKS

(71) Applicant: Microsoft Technology Licensing, LLC, Redmond, WA (US)

(72) Inventors: Andrew Wagner, Cupertino, CA (US); Tiyasa Mitra, San Jose, CA (US); Sujeeth Subramanya Bharadwaj, Milpitas, CA (US); Saurabh Mohan Kulkarni, Redmond, WA (US); Marc Tremblay, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 371 days.

(21) Appl. No.: 16/848,707

(22) Filed: Apr. 14, 2020

(65) Prior Publication Data
US 2021/0319309 A1 Oct. 14, 2021

(51) Int. Cl.
  *G06N 3/08* (2006.01)
  *G06F 17/15* (2006.01)
  *G06F 17/16* (2006.01)
  *G06N 3/04* (2006.01)

(52) U.S. Cl.
CPC ............. *G06N 3/08* (2013.01); *G06F 17/15* (2013.01); *G06F 17/16* (2013.01); *G06N 3/04* (2013.01)

(58) Field of Classification Search
CPC ........ G06F 17/15; G06F 17/16; G06F 40/126; G06N 3/04; G06N 3/0427; G06N 3/0454; G06N 3/08; G06N 3/084
See application file for complete search history.

(56) References Cited

U.S. PATENT DOCUMENTS

| 10,637,826 | B1* | 4/2020 | Luo | ..................... H04L 63/0245 |
| 2017/0256465 | A1* | 9/2017 | Van Leest | ........... G03F 7/70633 |
| 2018/0096247 | A1* | 4/2018 | Maruhashi | ............. G06N 3/084 |
| 2019/0026466 | A1* | 1/2019 | Krasser | .................. G06N 20/20 |
| 2019/0080236 | A1* | 3/2019 | Maruhashi | ............... G06N 3/04 |
| 2019/0304069 | A1* | 10/2019 | Vogels | ..................... G06N 3/08 |
| 2020/0050638 | A1* | 2/2020 | Hancock | ........... G06F 16/90344 |
| 2020/0074274 | A1* | 3/2020 | Fan | ........................ G06F 17/11 |

(Continued)

OTHER PUBLICATIONS

Siti-Farhana Lokman ,"Optimised Structure of Convolutional Neural Networks for Controller Area Network Classification," Apr. 11, 2019,2018 14th International Conference on Natural Computation, Fuzzy Systems and Knowledge Discovery (ICNC-FSKD),pp. 475-478.*

(Continued)

*Primary Examiner* — Omar S Ismail
(74) *Attorney, Agent, or Firm* — Fountainhead Law Group PC (57) ABSTRACT

Techniques for training neural networks are provided. According to one set of embodiments, a first array is processed in a spreading component to produce a second array, where a first dimension of the first array corresponds to at least one sequence of approximately orthogonal numeric vectors representing tokens, and where the spreading component combines values along the first dimension. The second array is processed in a transformer neural network to determine correlations between the sequence, which produces a third array. One or more batches of the third array are processed in a de-spreading component to produce a fourth array.

20 Claims, 9 Drawing Sheets

(56) References Cited

U.S. PATENT DOCUMENTS

2020/0410337 A1* 12/2020 Huang .................... G06N 3/04
2021/0201154 A1* 7/2021 Rozental ............... G06N 3/084

OTHER PUBLICATIONS

Schlutter, Aaron, "Knowledge Representation of Requirements Documents Using Natural Language Processing," Dec. 4, 2018, REFSQ 2018 Joint Proceedings of the Co-Located Events—NPL4RE: 1st Workshop on Natural Language Processing for Requirements Engineering, p. 1-7.*
Chengcheng Gou, "Learning sequential features for cascade outbreak prediction," Jan. 20, 2018, Knowledge and Information Systems vol. 57, pp. 721-739 (2018), pp. 721-726.*
Dave Anderson, "Artificial Neural Networks TECHNOLOGY," Aug. 20, 1992, A DACS State-of-the-Art Report, pp. 4-14, 56-64.*
"International Search Report and the Written Opinion Issued in PCT Application No. PCT/US2021/017207", dated Jun. 1, 2021, 10 Pages.
Zou, et al., "STEP: Sequence-to-Sequence Transformer Pre-training for Document Summarization", In Repository of arXiv:2004.01853v1, Apr. 4, 2020, 10 Pages.

* cited by examiner

SPREAD NEURAL NETWORKS

BACKGROUND

Natural-language understanding (NLU) is a subfield of natural-language processing (NLP) in artificial intelligence that addresses comprehension by computers of the structure and meaning of human language. NLU enables voice technology (e.g., Cortana®), search engines (e.g., Bing®), and machine translation (e.g., Microsoft® Translator) to deduce what a user means, regardless of the way it is expressed.

A neural network is a machine learning model that underpins NLU applications. A neural network is trained for a particular purpose by running datasets through it, comparing results from the neural network to known results, and updating the network based on the differences.

SUMMARY

Systems and methods for training neural networks are provided. According to one set of embodiments, a first array is processed in a spreading component to produce a second array, where a first dimension of the first array corresponds to at least one sequence of approximately orthogonal numeric vectors representing tokens, and where the spreading component combines values along the first dimension. The second array is processed in a transformer neural network to determine correlations between the sequence, which produces a third array. One or more batches of the third array are processed in a de-spreading component to produce a fourth array.

A further understanding of the nature and advantages of the embodiments disclosed herein can be realized by reference to the remaining portions of the specification and the attached drawings.

DETAILED DESCRIPTION

Embodiments of the present disclosure provide systems and methods for neural network training. It should be appreciated that the examples and details provided in the following description are illustrative and not intended to limit the embodiments of the present disclosure. For example, certain embodiments may be implemented without some of the described details or may be implemented with modifications or equivalents thereof.

As used herein, a neural network (also referred to as an artificial neural network (ANN)) is a computing system made up of a number of simple, highly interconnected processing elements, which process information by their dynamic state response to external inputs. In other words, a neural network is a computational model inspired by the way biological neural networks in the human brain process information. Neural networks are typically organized in layers. Layers are made up of interconnected nodes which contain an activation function. For example, each connection transfers the output of a neuron i to the input of a neuron j and each connection is assigned a weight $w_{ij}$. The activation function (or transfer function) of a node defines the output of that node given an input or set of inputs. Patterns are presented to the network via the input layer, which communicates to one or more hidden layers where processing is done via the system of weighted connections. The hidden layers then link to an output layer.

As used herein, training (or learning) is a supervised process that occurs with each cycle (e.g., each time a neural network is presented with a new input pattern) through a forward activation flow of outputs, and the backwards error propagation of weight adjustments. When a neural network is initially presented with a pattern it generates a result based on initial values of the weights. The neural network then sees how far its answer was from the actual one and makes an appropriate adjustment to its connection weights. Training then modifies the parameters (e.g., weights and thresholds) of the neural network, so a given input to the network will produce a favored output. One common training algorithm is referred to as backpropagation. In back propagation, an error between a result of the neural network is compared to a known result for the given input (e.g., from a training set) and the error (aka "delta") is successively back propagated from the output layer to an input layer to adjust the weight values.

Figure 1:
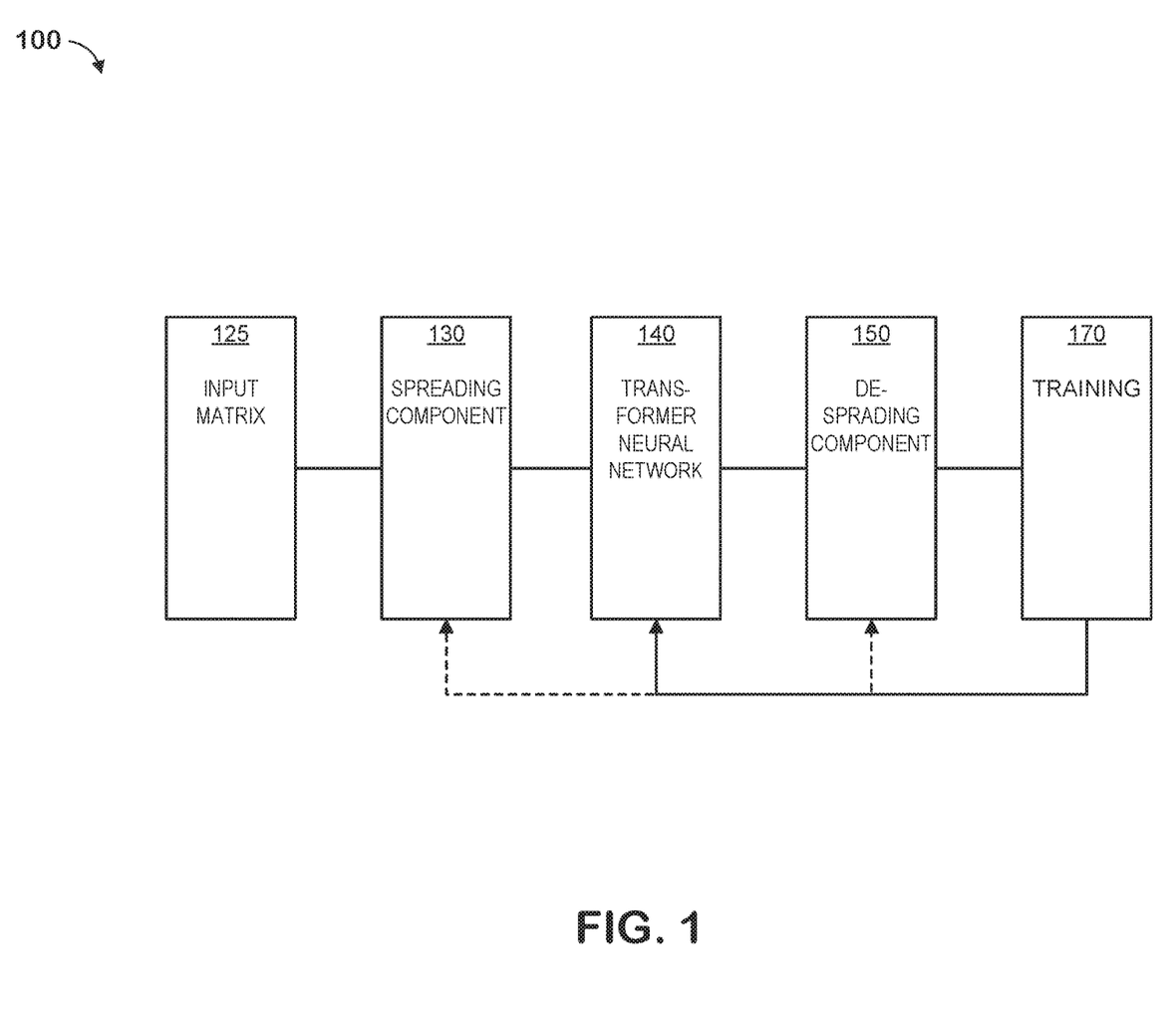
FIG. 1 depicts a simplified block diagram of a system environment according to certain embodiments.

FIG. 1 is a simplified block diagram of system environment 100 in accordance with certain embodiments. As shown, system environment 100 includes input matrix 125, spreading component 130, transformer neural network 140, de-spreading component 150, and training 170. According to some embodiments, input matrix 125 is an S×H array of vectors (matrix). In one example embodiment, the matrix represents a sequence of tokens, and the tokens are encoded representations of words. For example, dimension S is the length (number of words) in a sequence (a sentence) and dimension H is the size of a token (word). Each row of input matrix 125 stores a token, and each token can be represented by one or more floating-point numbers (e.g., IEEE-754). For example, H may be a vector of 128, 256, 1024, 2048, 4096, etc. floating-point numbers. Embodiments of the present disclosure may mask out certain tokens in each sequence, and the system may automatically determine correlations between tokens to produce a result corresponding to an identification of what the masked-out token (e.g., a word in a sentence) was, for example.

In one set of embodiments, the tokens in input matrix 125 are orthogonal. That is, each token has a unique (mutually exclusive) representation. For example, the tokens can be represented using one-hot encoding (e.g., a vector) to distinguish each token in a vocabulary from the other tokens in the vocabulary. A one-hot vector consists of 0s in all cells except for a single 1 in a cell used to uniquely identify the token.

In another set of embodiments, the tokens in input matrix 125 are approximately orthogonal (semi-orthogonal). For example, the size of the vocabulary (e.g., ~30,000 words)

exceeds what can be uniquely represented in a one-hot vector of size H. Here, the tokens cannot be fully orthogonal, but the tokens are as close as possible to being orthogonal in the context of the overall system design.

Spreading component 130 performs a spreading function. In various embodiments, the spreading function combines the values across a dimension of input matrix 125. For a matrix of rows corresponding to vectorized words of a sequence, for example, information about the words in the sequence may be spread (e.g., analogous to spread spectrum in communications theory) across the rows of the matrix. For example, in one embodiment spreading component 130 may be a feed-forward neural network. One particular neural network used for spreading may comprise two layers (e.g., an input and an output layer) with linear activation functions, for example. The output of a spreading neural network is an S×H matrix having rows d:

$$d_i = w_{1,i} c_1 + w_{2,i} c_2 + w_{s,s} c_s + b_i \qquad (1)$$

where $i=\{1, 2, 3, \ldots, S\}$, w are weights, b is a bias, and input matrix 125 comprises rows c. From the above equations, it can be seen that each new row of the output of the spreading matrix is a function of values from rows across the input. The input values are thus advantageously spread across the input.

In another embodiment described in more detail below, spreading component 130 interchanges subsets of the numeric vectors between vectors across the first dimension of the first array. In this case, rather than combining the S×H matrix in a neural network, the values are just repositioned. For instance, in one embodiment described in more detail below, a spreading component and de-spreading component interchange subsets of the numeric vectors across batches of the first array.

Transformer neural network 140 (also known as a "transformer") is a neural network having a sequence-to-sequence architecture. In other words, transformer neural network 140 transforms a given sequence of elements, such as the sequence of words in a sentence, into another sequence. Transformer neural network 140 can determine relationships/correlations between tokens in input matrix 125 (after being spread by spreading component 130). Transformer neural network 140 processes tokens in relation to all the other tokens in a sequence, instead of one-by-one in order. Transformer neural network 140 considers the full context of a token by looking at the tokens that come before and after it.

Transformer neural network 140 may be used for machine translation and search (conversational queries). Other applications include: document summarization, document generation, named entity recognition (NER), speech recognition, and biological sequence analysis. Non-limiting examples of transformer neural network 140 include such models as Bidirectional Encoder Representations from Transformers (BERT), Microsoft Machine Reading Comprehension (MS MARCO), Stanford Question Answering Dataset (SQuAD), Multi-Task Deep Neural Networks for Natural Language (MT-DNN), and the like. Embodiments of transformer neural network 140 are described further in relation to FIGS. 3 and 4.

De-spreading component 150 performs a de-spreading function. The de-spreading function may be the inverse function of the spreading function performed by spreading component 130, for example.

Training 170 trains the neural networks to improve their outputs. In FIG. 1 dashed lines are used to indicate training for the spreading component 130 and de-spreading component 150 if neural networks are used to implement these blocks. In various embodiments, training 170 compares the output from de-spreading component 150 with the known result from processing input matrix 125. Training 170 can determine how closely the output approximates the known result, sometimes referred to as a cost function, loss function, and objective function. Training 170 can compute the gradient of the cost function to adjust (e.g., weights, thresholds, and biases of) the neural networks. By way of non-limiting example, backpropagation is used to compute the gradient and stochastic gradient descent is used to adjust the neural networks.

Figure 2:
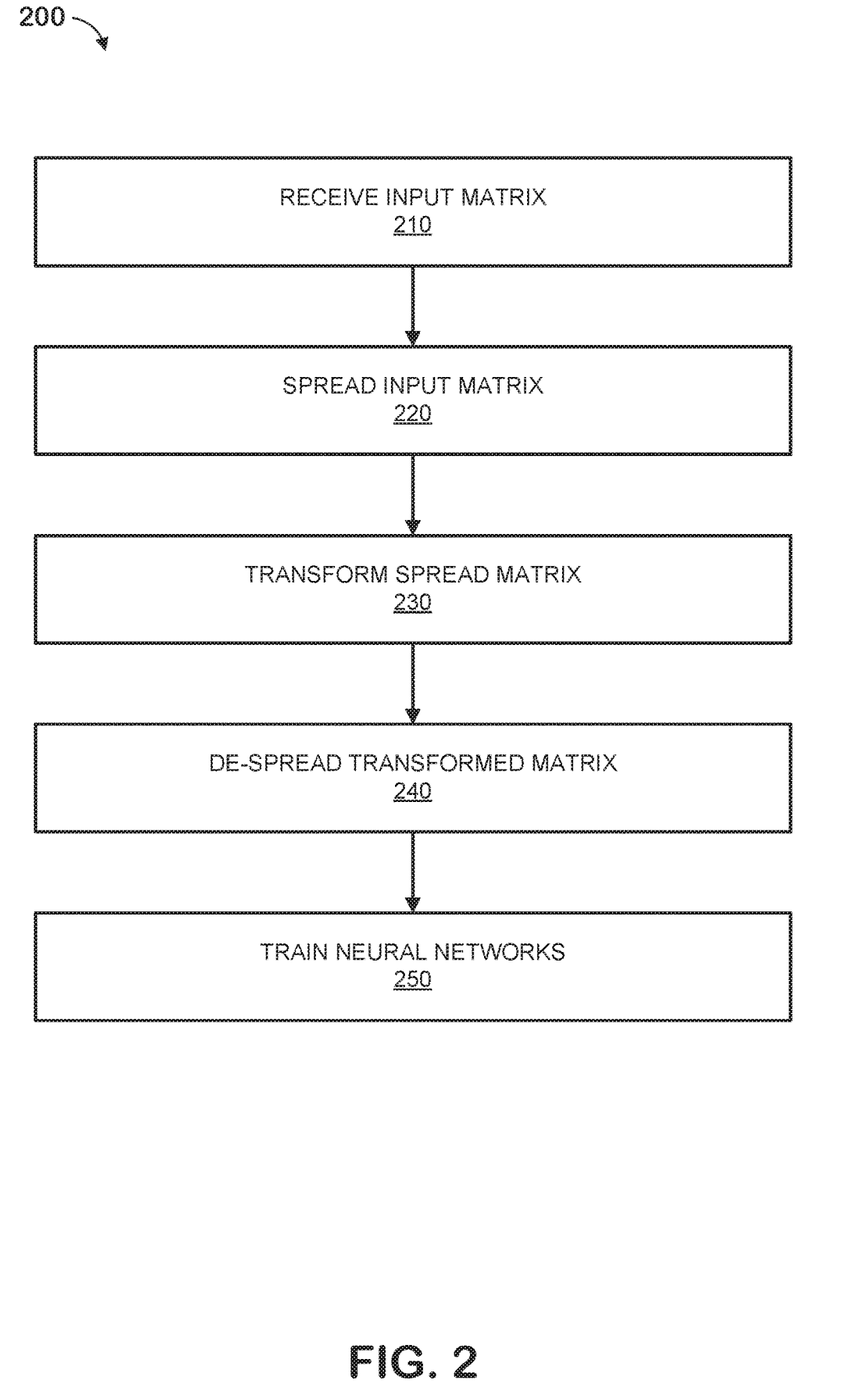
FIG. 2 depicts a flow diagram for training a neural network according to certain embodiments.

FIG. 2 illustrates a method 200 that may be performed by system environment 100 (FIG. 1) for training a transformer neural network, in accordance with certain embodiments. Commencing at step 210, an input matrix can be received. The input matrix can have at least some of the characteristics of input matrix 125 (FIG. 1). At step 220, the input matrix can be spread using a spreading component to produce a spread matrix.

At step 230, the spread matrix can be transformed using a transformer neural network (e.g., transformer neural network 140) to produce a transformed matrix. At step 240, the transformed matrix can be de-spread using a de-spreading component (e.g., de-spreading component 150) to produce a de-spread matrix. At step 250, one or more of the neural networks (e.g., spreading component 130 (in embodiments where spreading component 130 is a neural network), transformer neural network, and de-spreading component 150 (in embodiments where de-spreading component 150 is a neural network) in FIG. 1) can be trained using the de-spread matrix and a known result set corresponding to the input matrix. In accordance with some embodiments, step 250 is performed by training 170.

Figure 3:
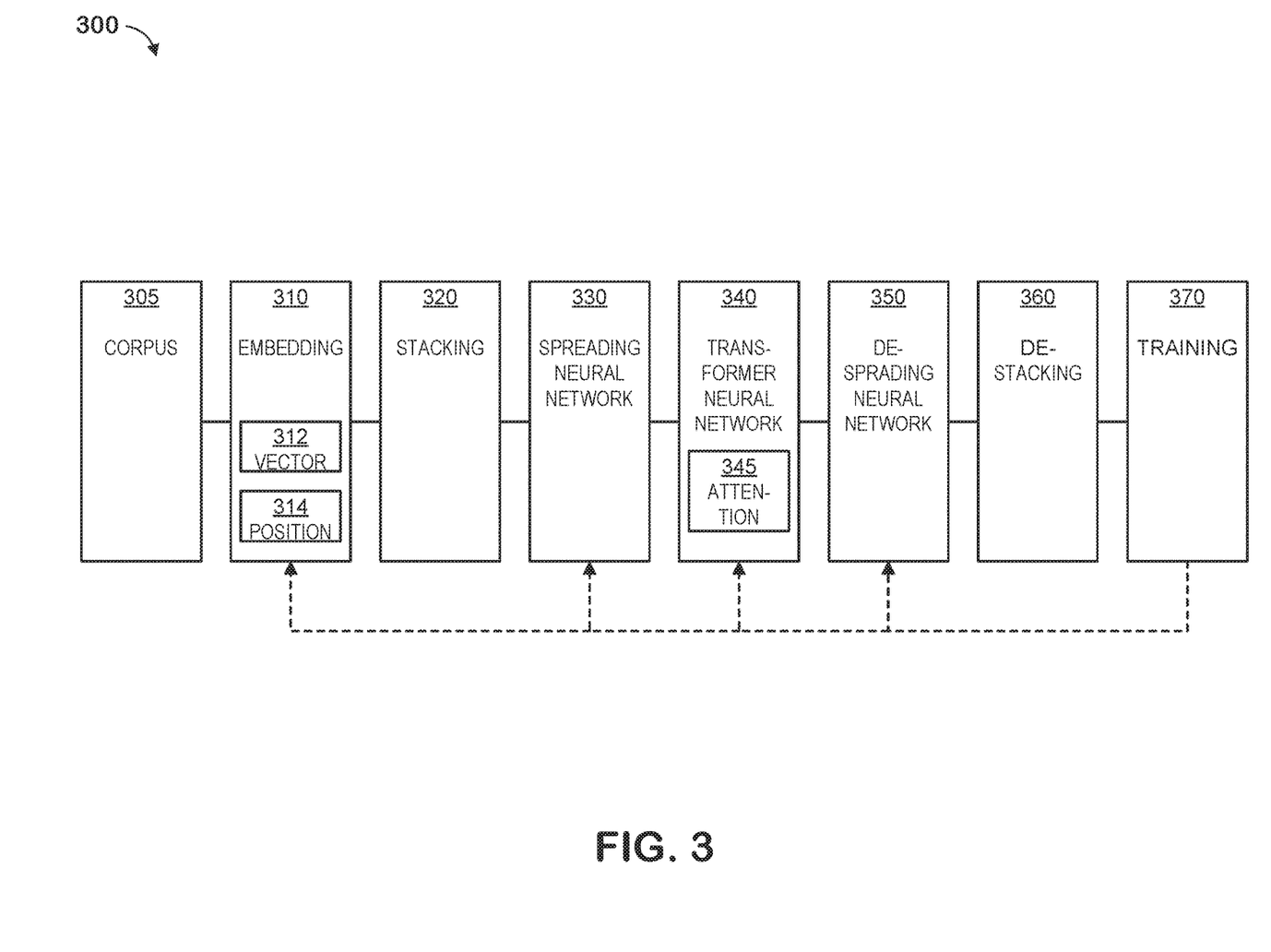
FIG. 3 depicts a simplified block diagram of a system environment according to certain embodiments.

FIG. 3 is a simplified block diagram of system environment 300 in accordance with some embodiments. System environment 300 includes corpus 305, embedding neural network 310, stacking 320, spreading neural network 330, transformer neural network 340, de-spreading neural network 350, de-stacking 360, and training 370. Corpus 305 comprises sequences of words (tokens) such as in sentences, paragraphs, etc. For example, corpus 305 can include a newspaper or magazine article, book, Wikipedia® article, and the like. One or more words (tokens) in each sentence processed by the system may be masked out, as described above, and the system may be trained to identify words that were masked out, for example.

Embedding 310 comprises vectorizing 312 and positioning 314. Embedding 310 receives sequences of tokens from corpus 305. Vectorization 312 in embedding 310 maps tokens into a set of numbers (e.g., a vector)—such as floating-point numbers (e.g., IEEE-754). For example, each word may be mapped to a vector (aka an array) comprising N=128, 256, 1024, 2048, 4096, etc. floating-point numbers. The mappings may be orthogonal (i.e., no two words share the same mapping) or semi-orthogonal (i.e., as close to orthogonal as the neural network in vectorizing 312 can be trained to make it). Orthogonality and semi-orthogonality were described above in relation to FIG. 1.

Embedding 310 uses positioning 314 to include information about the position of a token in a sequence (position of a word in the sentence) during mapping. Positioning 314 can include a table, neural network, and the like. Positioning 314 may be used to embed information about positions of words in a sequence, for example. For each sequence, embedding neural network 310 produces an S×H array of vectors (matrix), where dimension S is the length (number of words or tokens) in a sequence (sentence) and dimension H is the size of a token (word). Each row of the S×H matrix stores a token. Input matrix 125 (FIG. 1) may be produced by embedding neural network 310, for example.

Stacking 320 can combine multiple sequences (i.e., S×H matrices) into one batch for processing by the neural networks (e.g., spreading neural network 330, transformer neural network 340, and dispreading neural network 350). For example, when the number of inputs to the neural networks is an integer multiple of the sequence length (S), multiple batches of S×H matrices may be processed together. More specifically, when the sequence length is 256 tokens long and the inputs to the neural networks are 1024 tokens long, then four sequences can be placed one on top of the other ("stacked") and provided to the input of spreading neural network 330 at the same time in parallel. The stacking operation is described further in FIG. 4.

Spreading neural network 330 performs a spreading function. The spreading function combines the rows of the matrix produced by stacking 320 (or by embedding neural network 310 when stacking is not performed). Spreading neural network 330 has at least some of the characteristics of spreading component 130 (FIG. 1).

Transformer neural network 340 transforms a given sequence of elements, such as the sequence of words in a sentence, into another sequence. Transformer neural network 340 can have at least some of the characteristics of transformer neural network 140 (FIG. 1). Transformer neural network 340 comprises attention mechanism 345 which can include multiple (sub) neural networks. Attention mechanism 345 looks at an input sequence and decides which other parts of the sequence are important. Attention mechanism 345 can model relationships between tokens in a sequence, regardless of their respective position. To compute the next representation for a given token, attention mechanism 345 may compare it to every other token in the sequence, for example. The result of these comparisons is an attention score for every other token in the sequence. These attention scores determine how much each of the other tokens should contribute to the next representation for the given token. The attention scores are then used as weights for a weighted average of all tokens' representations which is fed into a fully-connected network to generate a new representation for the given token.

De-spreading neural network 350 performs a de-spreading function. The de-spreading function is the inverse of the spreading function performed by spreading neural network 330.

De-stacking 360 can separate the output from de-spreading neural network 350 into multiple sequences (i.e., S×H matrices). An example of the de-stacking operation is illustrated in FIG. 4.

Training 370 trains the neural networks (e.g., embedding neural network 310, spreading neural network 330, transformer neural network 340, and de-spreading neural network 350) to improve their output. Training 370 has at least some of the characteristics of training 170 (FIG. 1).

Figure 4A:
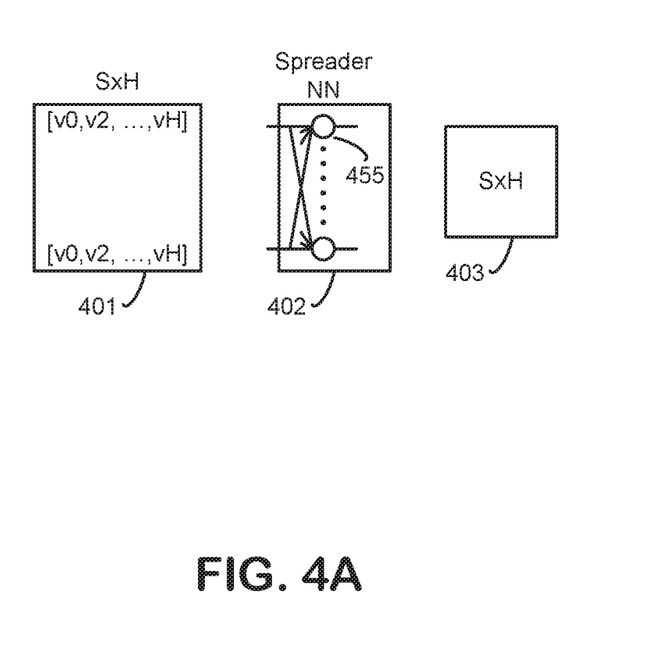
FIG. 4A depicts spreading according to certain embodiments.

FIG. 4A illustrates a spreader neural network according to an embodiment. In this example, an S×H matrix 401 comprises S rows (e.g., where S is a number of words in a sequence) and H columns (e.g., where H is the number of floating-point numbers used to represent each word). Features and advantages of the present disclosure spread information in the matrix across a first dimension of the array. Here, a spreader neural network 402 comprises an input layer comprising a plurality of nodes 455. Inputs to the spreading neural network are multiplied by weights at summed across all nodes, thereby spreading the information across the sequence. The output is an S×H matrix 403 that may be input to a transformer. Spreader neural network 451 may include a plurality of layers in other embodiments, for example.

Figure 4B:
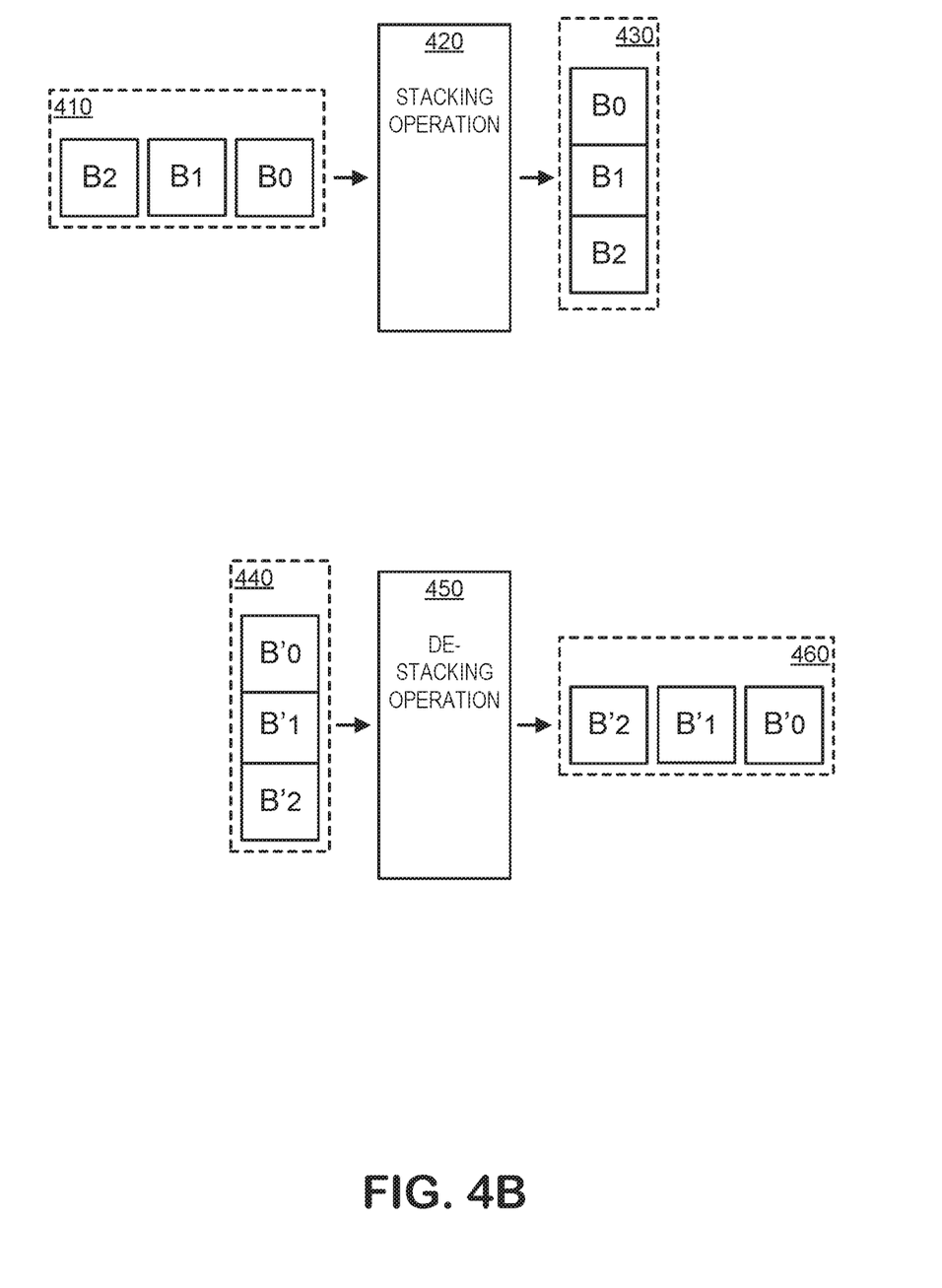
FIG. 4B depicts stacking and de-stacking according to certain embodiments.
Figure 4C:
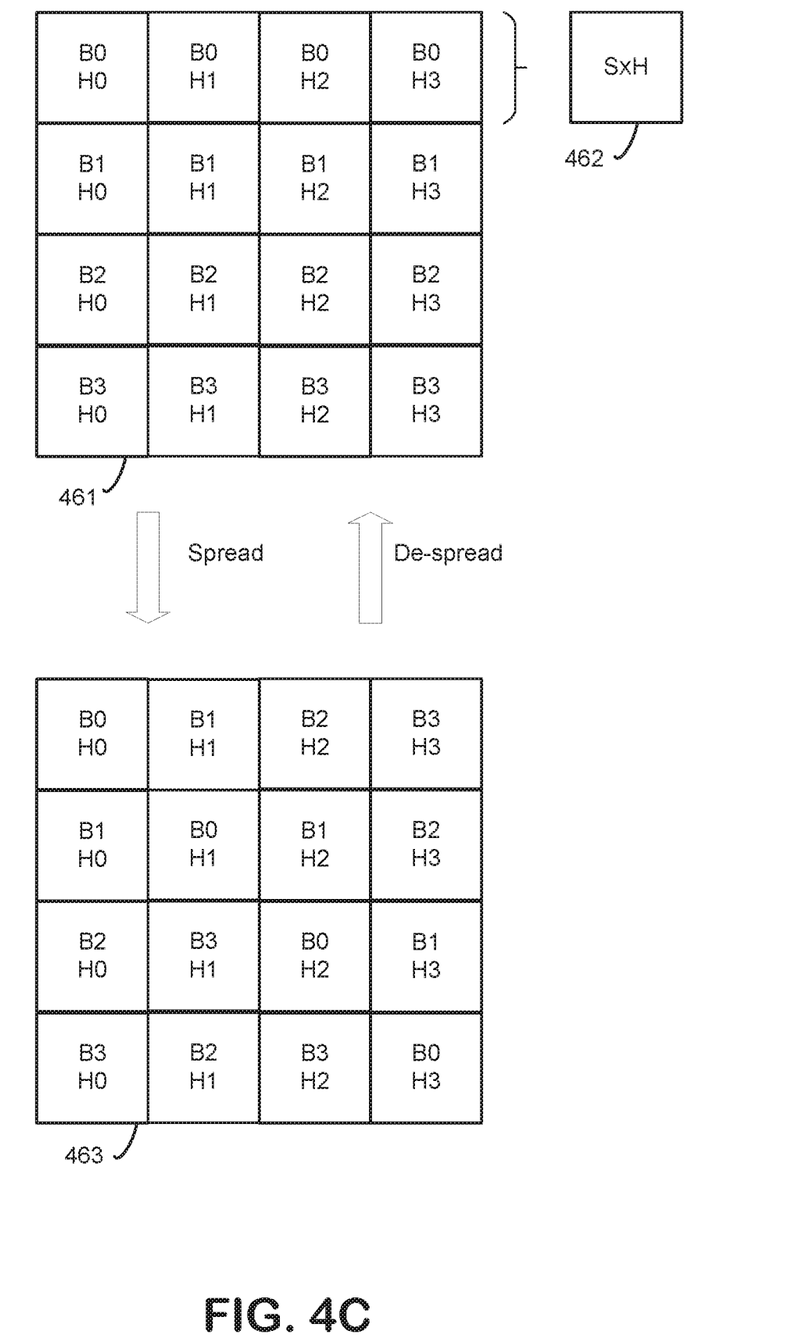
FIG. 4C depicts spreading and de-spreading according to certain embodiments.

FIG. 4B illustrates stacking and de-stacking according to some embodiments. A series of sequences (e.g., a sequence is input matrix 125 (FIG. 1)) can be processed by system environment 100 (FIG. 1) and/or system environment 300 (FIG. 3) serially (one after the other). When the number of inputs to the neural networks (FIGS. 1 and 3) is greater than the sequence length (S) (e.g., an integer multiple of S), more than one sequence can be processed in parallel (concurrently).

As shown in FIG. 4B, series batch 410 includes sequences $B_0$, $B_1$, and $B_2$, which are generally processed one after the other. Stacking operation 420 places the sequences in series batch 410 (e.g., $B_0$, $B_1$, and $B_2$) on top of each other to produce parallel batch 430, which can be processed all at once. In effect, parallel batch 430 is a large sequence. For example, when there are K sequences and each sequence is an S×H matrix, parallel batch 430 will have dimensions K*S×H. De-stacking operation 450 serializes parallel batch 440 to produce series batch 460. De-stacking operation 450 separates $B'_0$, $B'_1$, and $B'_2$ from parallel batch 440 to produce series batch 460. For example, series batch 460 will comprise K sequences, where each sequence is an S×H matrix.

FIG. 4C depicts spreading and de-spreading according to certain embodiments. As mentioned above, a spreading component and de-spreading component may interchange subsets of the numeric vectors between vectors across the first dimension of the first array. In this example, the spreading component and de-spreading component interchange subsets of the numeric vectors across batches of the first array. In this example, a plurality of S×H matrices are combined into a batch 461. Each row of batch 461 may comprise an S×H matrix 462 as described above, where the S rows are depicted here in a plurality of subsets of the vectors along the H-dimension (e.g., sometimes referred to as the hidden layer). Here, the first batch, B0, includes S rows and columns divided into 4 subsets H0, H1, H2, and H3. Similarly, other batches B1-B3 include vectors divided into subsets H0, H1, H2, and H3. In this example, spreading may involve interchanging subsets of the vectors in each row across batches. For instance, when batch 461 is spread, the result is batch 463. In batch 463, the H1 subsets of B0 and B1 have been interchanged. Similarly, subsets B0H2 is replaced with B2H2 and B0H3 is replaced with B3H3. In this example, the subsets retain their positions in the vectors, but they are moved to other batches to spread information about the words in the segment across the data set. As illustrated in FIG. 4C, de-spreading may be performed by interchanging the subsets of vectors in each row across batches in the reverse (or inverse) manner.

Figure 5:
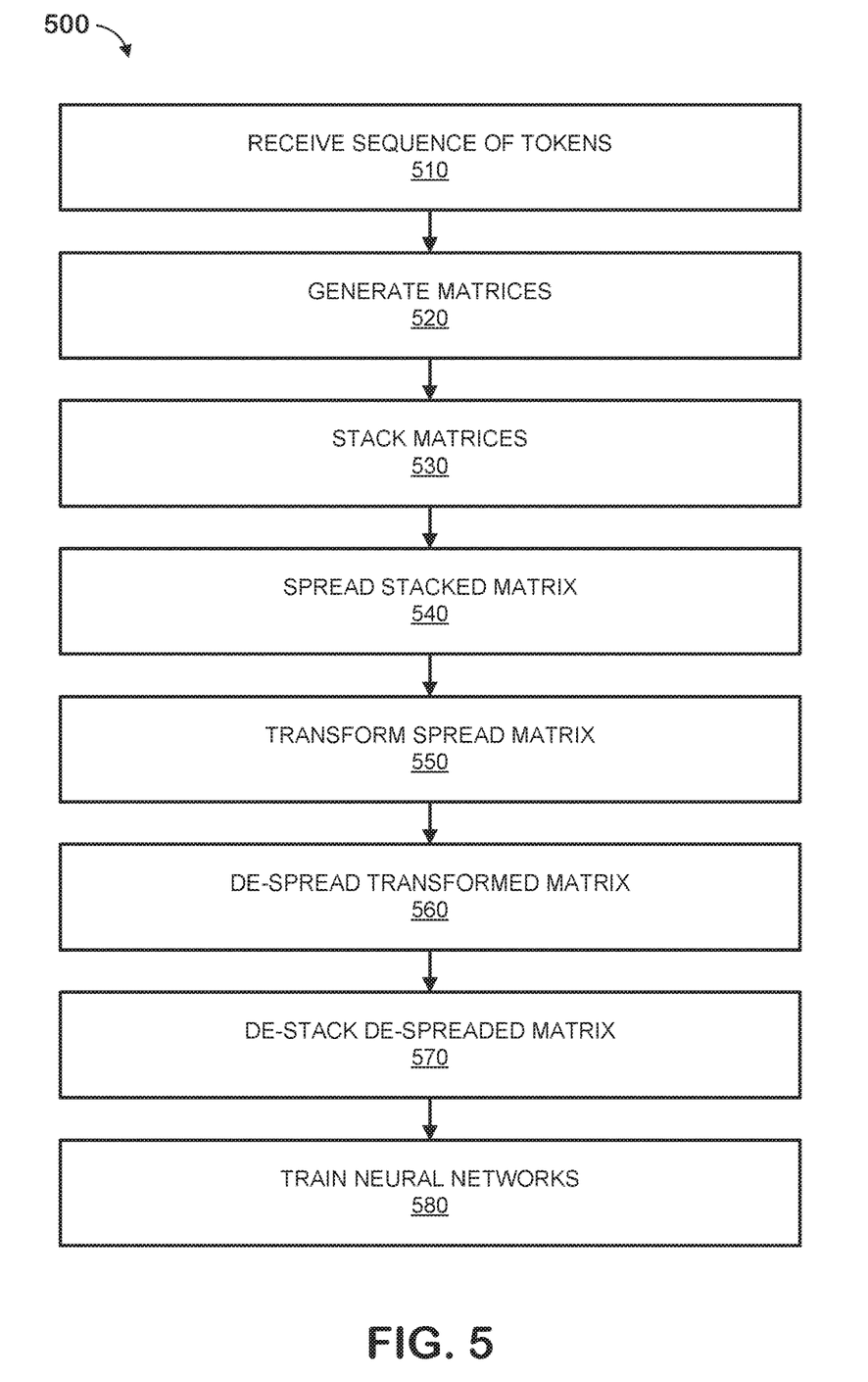
FIG. 5 depicts a flow diagram for training a neural network according to certain embodiments.

FIG. 5 illustrates a method 500 that may be performed by system environment 300 (FIG. 3) for training a transformer neural network, in accordance with certain embodiments. Commencing at step 510, sequences of tokens can be received. In some embodiments, sequences of tokens are received from corpus 305 (FIG. 3), and some of the tokens may be masked (e.g., with their values set to a predefined value, such as zero (0)). At step 520 matrices—each representing a sequence of tokens—are generated. For example, each matrix generated can have at least some of the characteristics of input matrix 125 (FIG. 1). Embedding neural network 310 (FIG. 3) can generate the matrices, according to some embodiments.

At step 530, the generated matrices can be stacked. An example of the stacking operation was illustrated in FIG. 4. The stacking operation is performed by stacking 320 (FIG. 3), in some embodiments. At step 540, the stacked matrix can be spread using a spreading neural network (e.g., spreading neural network 330) to produce a spread matrix.

At step 550, the spread matrix can be transformed using a transformer neural network (e.g., transformer neural network 540) to produce a transformed matrix. At step 560, the transformed matrix can be de-spread using a de-spreading neural network (e.g., de-spreading neural network 350 in FIG. 3) to produce a de-spread matrix. At step 570, the de-spread matrix can be de-stacked. An example of the de-stacking operation was presented in FIG. 4. The de-stacking operation is performed by de-stacking 360 (FIG. 3), in various embodiments.

At step 580, one or more of the neural networks (e.g., embedding neural network 310, spreading neural network 330, transformer neural network 340, and de-spreading neural network 350 in FIG. 3) can be trained using the de-stacked matrices and known results corresponding to the generated matrices. In accordance with some embodiments, step 580 is performed by training 360.

Embodiments of system environment 100 and system environment 300 offer improvements to neural network training, such as combining of correlated inputs without increasing the size of the neural network(s). This combination can yield faster convergence time by granting the neural networks exposure to multiple examples at the same time. In other words, more data is processed at the same time. For example, the transformer network's attention mechanism may, in some circumstances, comprise a set of large but sparse matrices. By providing combinations of the input data using spreading and de-spreading techniques described above, the attention mechanism can create additional correlations. When system environment 100 and/or system environment 300 are in processing systems with limited memory, providing more data (e.g., sequences) at the input reduces memory usage.

Figure 6:
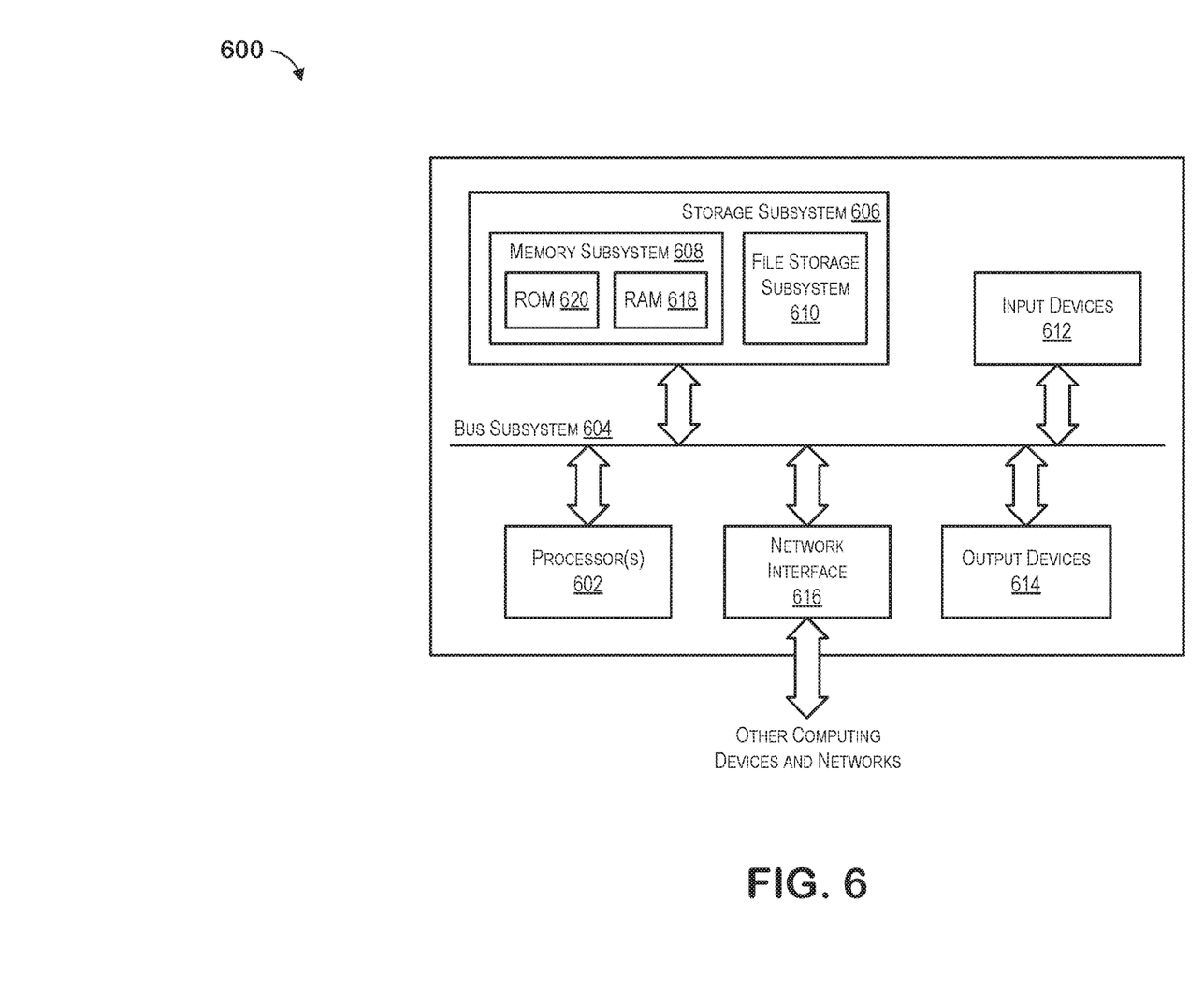
FIG. 6 depicts a simplified block diagram of an example computer system according to certain embodiments.

FIG. 6 depicts a simplified block diagram of an example computer system 600 according to certain embodiments. Computer system 600 can be used to implement any of the computing devices, systems, or servers described in the foregoing disclosure, such as system environment 100 (FIG. 1) and system environment 300 (FIG. 3). As shown in FIG. 6, computer system 600 includes one or more processors 602 that communicate with a number of peripheral devices via a bus subsystem 604. These peripheral devices include a storage subsystem 606 (comprising a memory subsystem 608 and a file storage subsystem 610), user interface input devices 612, user interface output devices 614, and a network interface subsystem 616.

Bus subsystem 604 can provide a mechanism for letting the various components and subsystems of computer system 600 communicate with each other as intended. Although bus subsystem 604 is shown schematically as a single bus, alternative embodiments of the bus subsystem can utilize multiple busses.

Network interface subsystem 616 can serve as an interface for communicating data between computer system 600 and other computer systems or networks. Embodiments of network interface subsystem 616 can include, e.g., an Ethernet card, a Wi-Fi and/or cellular adapter, a modem (telephone, satellite, cable, ISDN, etc.), digital subscriber line (DSL) units, and/or the like.

User interface input devices 612 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 600.

User interface output devices 614 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 600.

Storage subsystem 606 includes a memory subsystem 608 and a file/disk storage subsystem 610. Subsystems 608 and 610 represent non-transitory computer-readable storage media that can store program code and/or data that provide the functionality of embodiments of the present disclosure.

Memory subsystem 608 includes a number of memories including a main random access memory (RAM) 618 for storage of instructions and data during program execution and a read-only memory (ROM) 620 in which fixed instructions are stored. File storage subsystem 610 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 600 is illustrative and many other configurations having more or fewer components than system 600 are possible.

Figure 7:
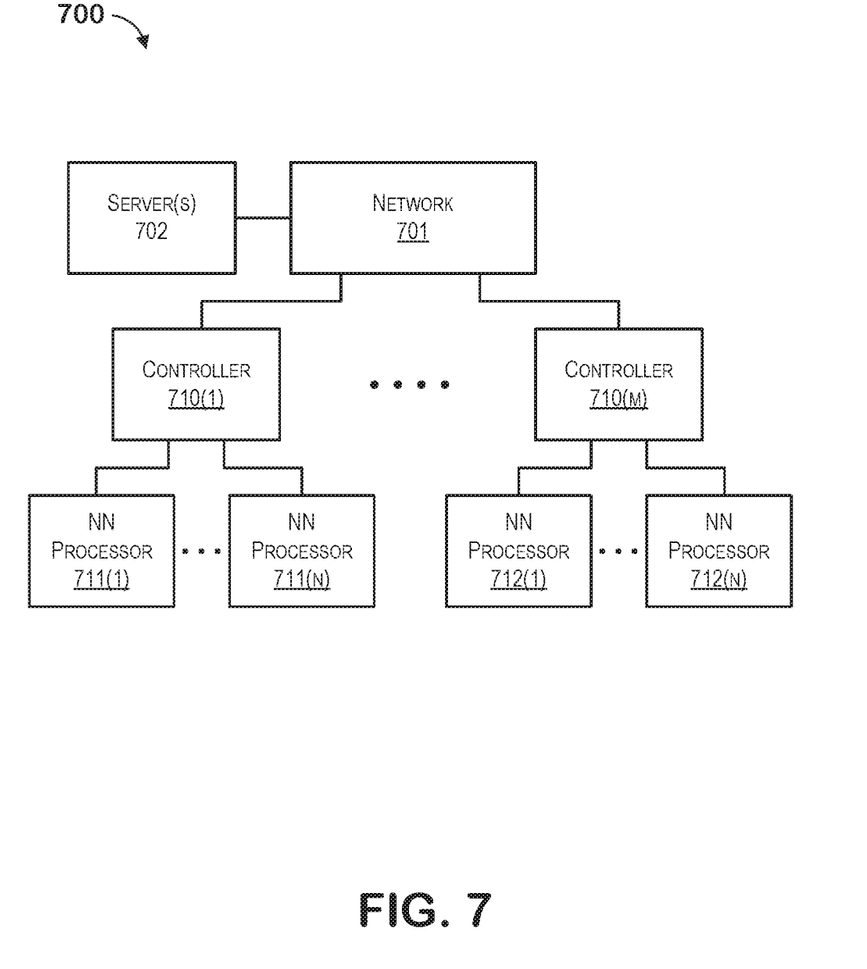
FIG. 7 illustrates a neural network processing system according to some embodiments.

FIG. 7 illustrates a neural network processing system according to some embodiments. This example system may be used to implement the systems shown in FIG. 1 or FIG. 3, or both, for example. In various embodiments, neural networks according to the present disclosure may be implemented and trained in a hardware environment comprising one or more neural network processors. A neural network processor may include various graphics processing units (GPU) (e.g., a GPU for processing neural networks produced by Nvidia Corp®), field programmable gate arrays (FPGA) (e.g., FPGAs for processing neural networks produced by Xilinx®), or a variety of application specific integrated circuits (ASICs) or neural network processors comprising hardware architectures optimized for neural network computations, for example. In this example environment, one or more servers 702 comprising architectures illustrated in FIG. 6 above, may be coupled to a plurality of controllers 710(1)-710(M) over a data network 701. Controllers 710(1)-710(M) may also comprise architectures illustrated in FIG. 6 above. Each controller 710(1)-710(M) may be coupled to one or more NN processors, such as processors 711(1)-711(N) and 712(1)-712(N), for example. The NN processors are optimized for neural network computations. Server 702 may configure controllers 710 with NN models and inputs to the models to be loaded and executed by NN processors 711(1)-711(N) and 712(1)-712(N) in parallel, for example. Models may include spreading neural networks, transformer neural networks, and de-spreading neural networks and inputs may include input matrix 125 described above in connection with FIG. 1, for example. NN processors may load the models and apply the inputs to produce output results. NN processors may also implement training algorithms described herein, for example.

FURTHER EXAMPLES

In various embodiments, the present disclosure includes a method of performing natural language processing. The method may be embodied in non-transitory computer readable storage medium having stored thereon program code executable by a computer system, the program code causing the computer system to perform the techniques described herein. In some embodiments, the computer system may include a processor (e.g., one or more artificial intelligence processors and one or more controllers). The non-transitory computer readable storage medium may be memory, for example, which may be coupled to a processor, one or more controllers or one or more artificial intelligence processors, for example.

The following techniques may be embodied alone or in different combinations and may further be embodied with other techniques described herein.

For example, in one embodiment, the present disclosure includes a computer system configured to perform natural language processing comprising: a processor; and a memory having stored thereon program code that, when executed by the processor, causes the processor to: process a first array in a spreading component to produce a second array, wherein a first dimension of the first array corresponds to at least one sequence of approximately orthogonal numeric vectors representing tokens, and wherein the spreading component combines values along the first dimension; process the second array in a transformer neural network to determine correlations between the at least one sequence, said processing the second array producing a third array; and process the third array in a de-spreading component to produce a fourth array.

In one embodiment, the spreading component and de-spreading component are neural networks, wherein the spreading component is configured to combine values along the first dimension.

In one embodiment, the spreading component and de-spreading component interchange subsets of the numeric vectors between vectors across the first dimension of the first array.

In one embodiment, the spreading component and de-spreading component interchange subsets of the numeric vectors across batches of the first array.

In one embodiment, the de-spreading component is the inverse of the spreading component.

In one embodiment, one or more of the tokens is masked.

In one embodiment, techniques of the disclosure include determining if the size of the first dimension corresponding to the sequence length is below a first threshold, wherein if the size of the first dimension is below the first threshold, said processing comprises processing a plurality of batches of the array.

In one embodiment, techniques of the disclosure include, prior to processing the one or more batches of the first array, stacking a plurality of batches of the first array.

In one embodiment, techniques of the disclosure include de-stacking the fourth array into a plurality of fifth arrays having first and second dimensions equal to the first array.

The above description illustrates various embodiments of the present disclosure along with examples of how aspects of these embodiments may be implemented. The above examples and embodiments should not be deemed to be the only embodiments, and are presented to illustrate the flexibility and advantages of the present disclosure as defined by the following claims. The specification and drawings are, accordingly, to be regarded in an illustrative rather than restrictive sense. Other arrangements, embodiments, implementations and equivalents will be evident to those skilled in the art and may be employed without departing from the spirit and scope of the present disclosure as set forth in the following claims.

What is claimed is:

1. A computer system comprising:
   a processor; and
   a memory having stored thereon program code that, when executed by the processor, causes the processor to:
   process a first array in a spreading component to produce a second array, wherein a first dimension of the first array corresponds to at least one sequence of approximately orthogonal numeric vectors representing tokens, and wherein the spreading component combines values along the first dimension;
   process the second array in a transformer neural network to determine correlations between the at least one sequence, said processing the second array producing a third array; and
   process the third array in a de-spreading component to produce a fourth array.

2. The computer system of claim 1, wherein the spreading component and de-spreading component are neural networks, wherein the spreading component is configured to combine values along the first dimension.

3. The computer system of claim 1, wherein the spreading component and de-spreading component interchange subsets of the numeric vectors between vectors across the first dimension of the first array.

4. The computer system of claim 1, wherein the spreading component and de-spreading component interchange subsets of the numeric vectors across batches of the first array.

5. The computer system of claim 1, wherein the de-spreading component is the inverse of the spreading component.

6. The computer system of claim 1, the code further causing the processor to mask one or more of the tokens.

7. The computer system of claim 1, wherein the tokens are encoded words from sequences of words.

8. The computer system of claim 1, the code further causing the processor to determine if a size of the first dimension corresponding to the sequence length is below a first threshold, wherein if the size of the first dimension is below the first threshold, said processing comprises processing a plurality of batches of the first array.

9. The computer system of claim 8, the code further causing the processor to, prior to processing the plurality of batches of the first array, stack the plurality of batches of the first array.

10. The computer system of claim 9, the code further causing the processor to de-stack the fourth array into a plurality of fifth arrays having first and second dimensions equal to the first array.

11. A method processing data in a neural network comprising:
    processing a first array in a spreading component to produce a second array, wherein a first dimension of the first array corresponds to at least one sequence of approximately orthogonal numeric vectors representing tokens, and wherein the spreading component combines values along the first dimension;
    processing the second array in a transformer neural network to determine correlations between the at least one sequence, said processing the second array producing a third array; and processing the third array in a de-spreading component to produce a fourth array.

12. The method of claim 11, wherein the de-spreading component is the inverse of the spreading component.

13. The method of claim 11, further comprising masking one or more of the tokens.

14. The method of claim 11, wherein the spreading component and de-spreading component are neural networks, wherein the spreading component is configured to combine values along the first dimension.

15. The method of claim 11, wherein the spreading component and de-spreading component interchange subsets of the numeric vectors between vectors across the first dimension of the first array.

16. The method of claim 11, wherein the spreading component and de-spreading component interchange subsets of the numeric vectors across batches of the first array.

17. The method of claim 11, wherein the tokens are encoded words from sequences of words.

18. The method of claim 11, further comprising determining if a size of the first dimension corresponding to the sequence length is below a first threshold, wherein if the size of the first dimension is below the first threshold, said processing comprises processing a plurality of batches of the first array.

19. A computer readable storage medium having stored thereon program code executable by a computer system, the program code causing the computer system to:
   encode a plurality of sequences of words, wherein each word is represented by a numeric vector, the encoding producing a plurality of first arrays, each first array of the plurality of first arrays having a first dimension corresponding to a sequence length equal to a number of words in each sequence and a second dimension corresponding to a length of the numeric vector;
   process one or more batches of the first array in a spreading neural network to produce a second array, wherein the spreading neural network combines values along the first dimension;
   process the second array in a transformer neural network comprising an attention layer to determine correlations between the sequences of words, said processing the second array producing a third array; and
   process one or more batches of the third array in a de-spreading neural network to produce a fourth array.

20. The computer readable storage medium of claim 19, wherein the de-spreading component is the inverse of the spreading component.

* * * * *